United States Patent [19]

Shibata

[11] Patent Number: 5,684,864
[45] Date of Patent: Nov. 4, 1997

[54] INFORMATION COMMUNICATING APPARATUS USABLE AS PRINTER OF INFORMATION

[75] Inventor: Koichi Shibata, Osaka, Japan

[73] Assignee: Mita Industrial Company, Ltd., Osaka, Japan

[21] Appl. No.: 525,343

[22] Filed: Sep. 7, 1995

[30] Foreign Application Priority Data

Sep. 12, 1994 [JP] Japan .................................. 6-216850

[51] Int. Cl.⁶ ................................................ H04M 11/00
[52] U.S. Cl. ........................... 379/96; 379/100; 358/442; 358/468
[58] Field of Search ............................. 379/100, 96–99, 379/93, 354–357; 358/440, 442, 468, 434–436; H04N 1/32

[56] References Cited

U.S. PATENT DOCUMENTS 4,991,200  2/1991  Li ............................................. 379/100
5,295,181  3/1994  Kuo ............................................. 379/10
5,452,106  9/1995  Perkins ..................................... 379/100
5,481,598  1/1996  Bergler et al. ........................... 379/100

FOREIGN PATENT DOCUMENTS 0655852  5/1995  European Pat. Off. ................ 379/100

Primary Examiner—Wing F. Chan
Attorney, Agent, or Firm—Beveridge, Degrandi, Weilacher & Young, LLP

[57] ABSTRACT

An operation unit is operated to register a telephone number for a printing function. When an ATD command including the registered printing function telephone number is inputted from the personal computer, a control unit makes a determination of a print control command added at the end of the ATD command, and based on the result of the determination, an original of one sheet or an original of a plurality of sheets is printed out in a plurality of copies (sort copy or group copy). The print control command preferably includes an original, sort or group copy representation succeeded by a copy number representation. Thereby, the image information transmitted from the personal computer is printed out with a high function.

6 Claims, 5 Drawing Sheets

ASCII CODE OF "A"   $41_H = 01000001_2$

START  LSB            MSB  STOP

TRANSFER RATE IS DETERMINED BY MEASURING THIS TIME

PRIOR ART

INFORMATION COMMUNICATING APPARATUS USABLE AS PRINTER OF INFORMATION

BACKGROUND OF THE INVENTION

1. Field of the Invention

The present invention relates to an information communicating apparatus, and more specifically, to an information communicating apparatus such as a facsimile apparatus capable of performing communication of image data such as text and graphic data with an external information processing apparatus such as a personal computer to transmit signals corresponding to the data.

2. Description of the Prior Art

In recent years, various types of modems (i.e. fax modems) having a PC-FAX function and facsimile apparatuses incorporating fax modems have been presented as commercial products. The PC-FAX function is a function to directly facsimile-transmit texts (e.g. texts including letters and symbols) and graphics (e.g. figures and photos) prepared on a word processor or on a personal computer and to receive images facsimile-transmitted through the telephone line to directly input them to a personal computer.

Hereinafter, a conventional facsimile apparatus incorporating a fax modem as mentioned above will be described. FIG. 1A is an appearance view showing a connection among a facsimile apparatus 110 incorporating a fax modem, a personal computer 100 and a telephone line 120. FIG. 1B is a block diagram schematically showing the connection. As shown in FIG. 1B, the facsimile apparatus 110 is provided with a main body 112 having the main function of the facsimile apparatus 110 and an RS-232C port 111 connected to the main body 112. The the RS-232C port 111, the personal computer 100 is connected, and to the main body 112, the telephone lline 120 is connected.

The above-mentioned PC-FAX function is realixed by using the facsimile apparatus 110 as a fax modem. Specifically, the facsimile apparatus 110, which is controlled by the personal computer 100 according to control commands called AT commands, makes an outside call and receives data transmitted through the telephone line based on the AT commands transmitted from the personal computer 100.

In directly facsimile-transmitting image data (these image data are not limited ot graphics but are image information including symbolic image data consisting of code data representing letters) produced on the personal computer 100, an ATD command which is one of the AT commands is transmitted from the personal computer 100 to the main body 112 through the RS-232C port 111 together with the image data. The ATD command is a dialing command. For example, a command to dial an outside line number 987-6543 lis transmitted from the personal computer 100 to the facsimile apparatus 110 by an ATD command "ATD987-6543" consisting of ASCII codes. In the ATD987-6543, "A" and "T" are attention commands, "D" is a command to specify the telephone number of the receiver, and "987-6543" is the telephone number of the receiver.

When the ATD command is received, the facsimile apparatus 110 automatically detects the transfer rate. For example, as shown in FIG. 2, an ASCII code "A" is transmitted from the personal computer 100 to the facsimile apparatus 110 as a serial data which varies with time. The facsimile apparatus 110 measures the time of the start bit thereof to detect the transfer rate.

After transmitting the ATD command, the personal computer 100 transmits image data to the facsimile apparatus 110 according to a predetermined protocol. When the telephone line 120 is connected, the facsimile 110 facsimile-transmits through the telephone line 120 signals corresponding to the image data transmitted from the personal computer 100 subsequently to the ATD987-6543 command.

In addition to the above-described transmitting function, the PC-FAX function of the facsimile apparatus 110 includes a receiving function to receive data transmitted through the outside line to input them to the personal computer 100. The facsimile apparatus 110 is also provided with the normal facsimile function to read out image data of an original with a reading unit (not shown) to facsimile-transmit them through the telephone line 120 and to facsimile-receive image data transmitted through the telephone line 120 to print out them from a recording unit (not shown).

To print out data in the personal computer 100, it is originally necessary to prepare an exclusively used printer on the side of the personal computer 100. However, if the above-mentioned recording unit provided in the facsimile apparatus 110 is used as the printer of the personal computer 100, it is unnecessary to connect a printer to the personal computer 100. Thus, it is very advantageous to use the recording unit also as the printer of the personal computer 100 since the duplication of apparatuses capable of printing is avoided.

To use the recording unit also as the printer of the personal computer 100, for example, a specific telephone number is allotted to the facsimile apparatus 110 and by applying the ATD command to dial the telephone number, the above-described facsimile transmission is performed to the facsimile apparatus 110. Thereby, data in the personal computer 100 can be printed out from the recording unit of the facsimile apparatus 110 (hereinafter, this function will be referred to as printing function).

However, since the printing out is merely a part of the normal facsimile transmission operation, according to this method, only one copy can be printed out in a single data transmission from the personal computer 100 to the facsimile apparatus 110. Therefore, to print out a plurality of copies, it is necessary to transmit the ATD command and the image data from the personal computer 100 to the facsimile apparatus 110 a plurality of times.

Thus, according to a conventional information communicating apparatus such as the facsimile apparatus 110 having the PC-FAX function, in printing out image information transmitted from an external information processing apparatus such as the personal computer 100 from the recording unit for facsimile reception, the printing function is limited, so that printing of a high function cannot be performed.

SUMMARY OF THE INVENTION

An object of the present invention is to provide an information communicating apparatus capable of printing out image information transmitted from an external information processing apparatus with a high function.

To achieve the above-mentioned object, an information communicating apparatus of the present invention which receives telephone number information and image information transmitted from an external information processing apparatus, dials a telephone number included in the telephone number information to originate a call, and transmits said image information through a telephone line, is provided with printing means for printing out the image information;

and controlling means for, when the telephone number included in the telephone number information is a pre-registered telephone number for a printing function and the telephone number information includes a print control command to control the printing function of the printing means, controlling a printing operation by the printing means so that the printing means performs printing based on the print control command.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1A:
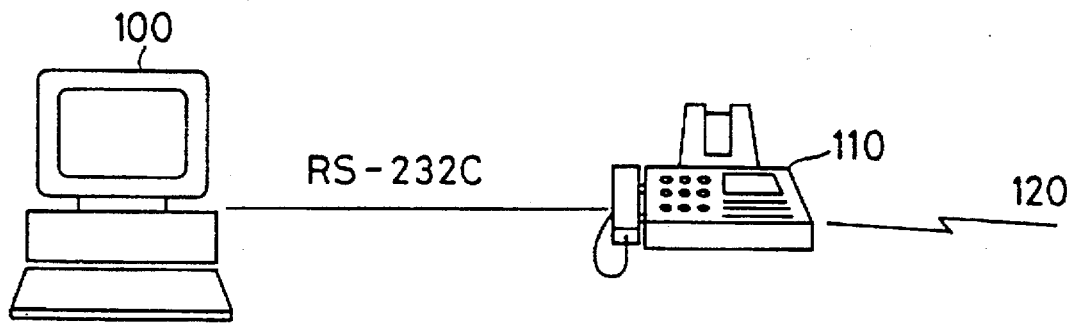
FIG. 1A is an appearance view showing a connection among a facsimile apparatus incorporating a fax modem, a personal computer and the telephone line.
Figure 1B:
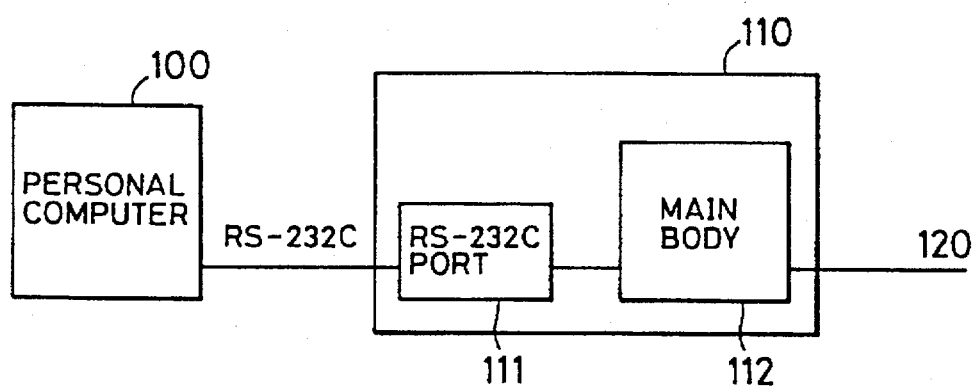
FIG. 1B is a block diagram showing a connection among an RS-232C port and a main body constituting the facsimile apparatus, the personal computer and the telephone line.
Figure 2:
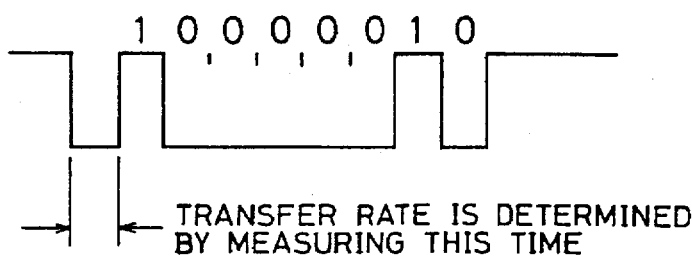
FIG. 2 shows the waveform of a signal representing a part of the data of an ATD command.
Figure 3:
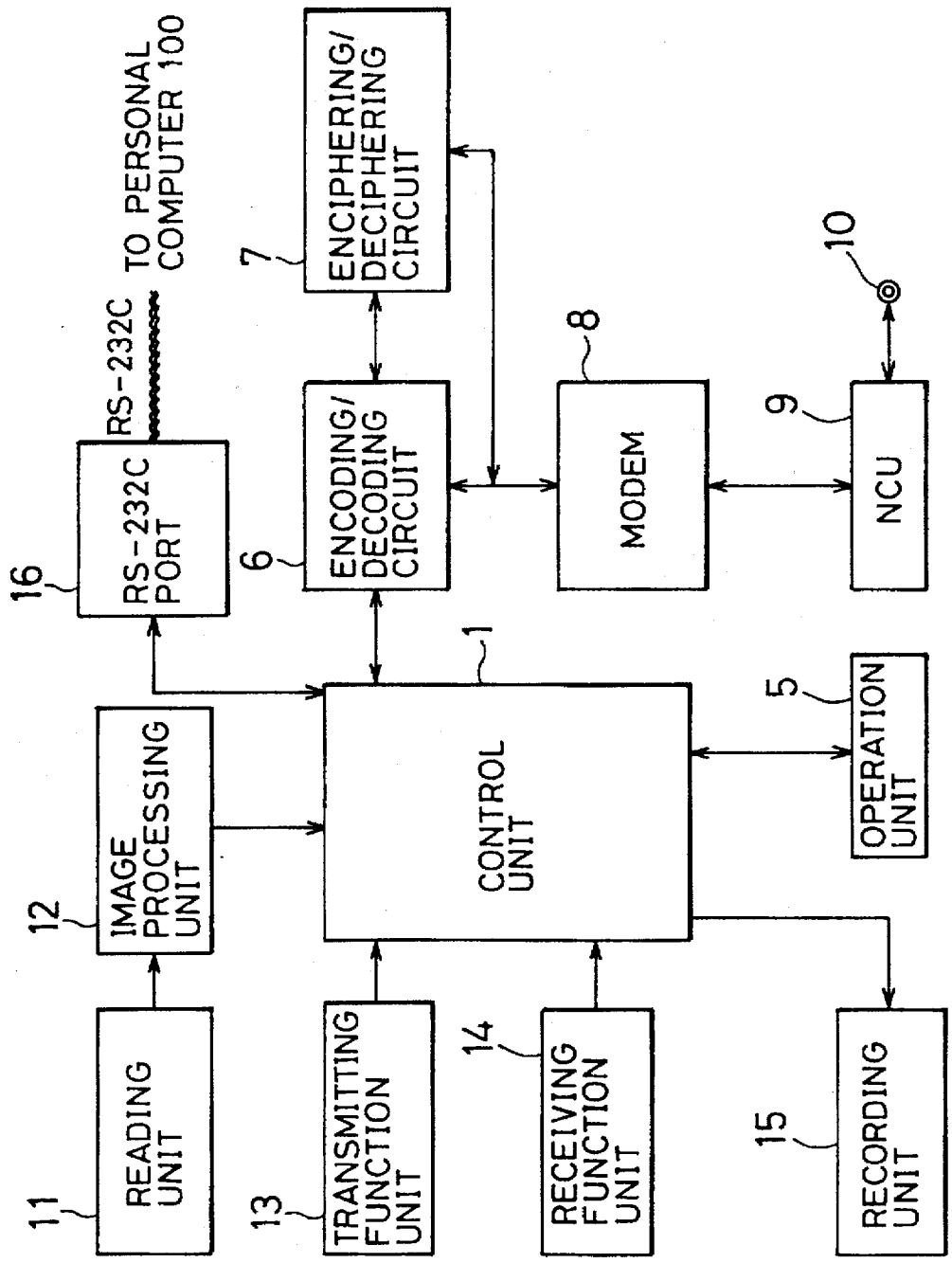
FIG. 3 is a block diagram showing the general arrangement of a facsimile apparatus embodying the present invention.
Figure 4:
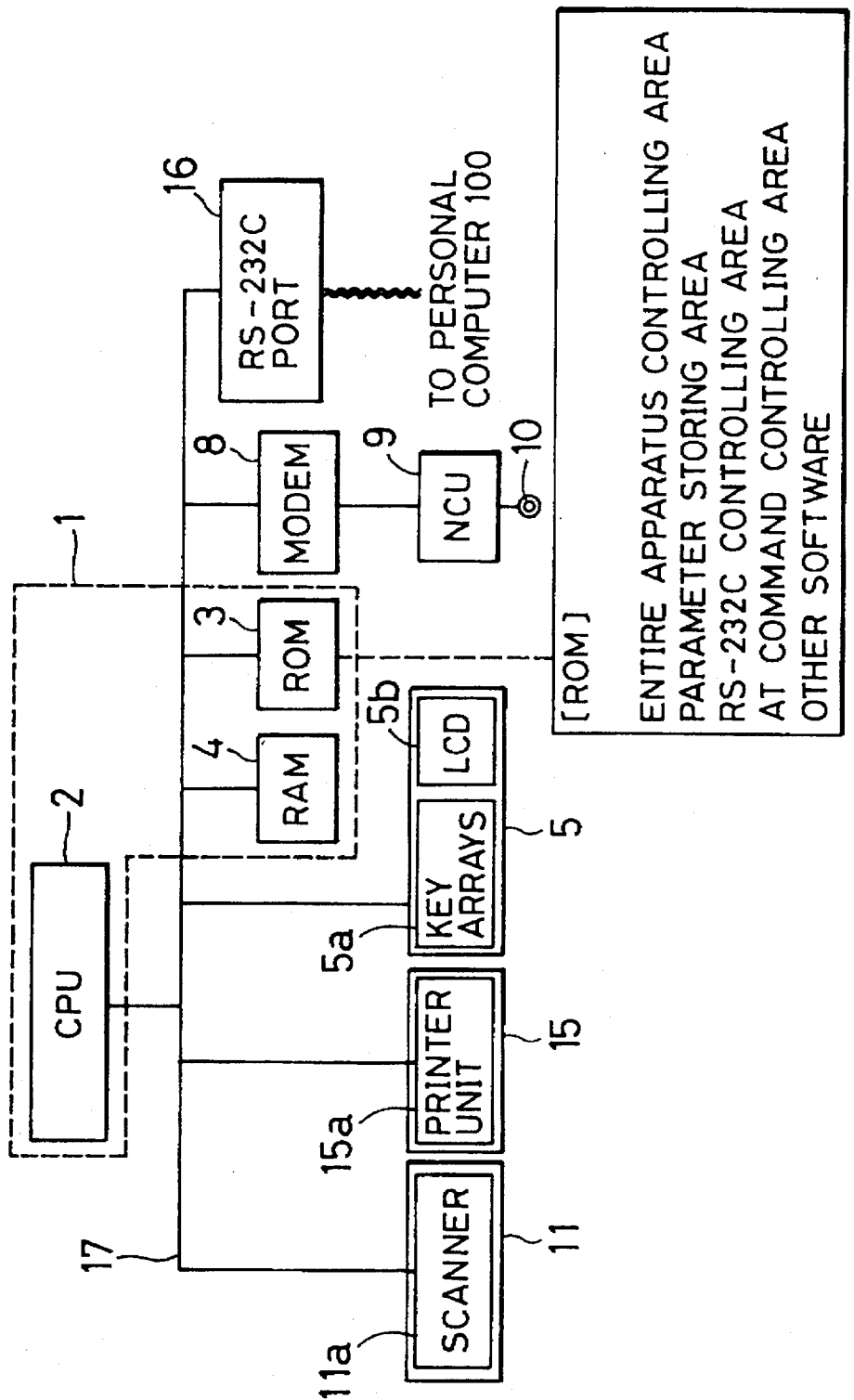
FIG. 4 is a block diagram showing a control unit of FIG. 3 and other peripheral elements.

Hereinafter, a facsimile apparatus embodying an information communicating apparatus of the present invention will be described with reference to the drawings. FIG. 3 is a block diagram showing the general arrangement of a facsimile apparatus incorporating a fax modem according to this embodiment. FIG. 4 shows a specific arrangement of a control unit and other peripheral elements.

Referring to FIG. 3, reference numeral 1 is a control unit comprising a microcomputer which controls the entire apparatus. The control unit 1 includes, as shown in FIG. 4, a central processing unit (hereinafter, referred to as CPU) 2, a memory device (hereinafter, referred to as ROM) 3 exclusively used for reading out programs and a random access memory (hereinafter, referred to as RAM) 4. The ROM 3 is used, as shown in FIG. 4, as an entire apparatus controlling area in which a program to control the entire apparatus is stored, a parameter storing area in which parameters used in the program are stored, an RS-232C controlling area, an AT command controlling area and the like.

Returning to FIG. 3, reference numeral 5 represents an operation unit. Reference numeral 6 represents an encoding/decoding circuit. Reference numeral 7 represents an enciphering/deciphering circuit. Reference numeral 8 represents a modem. Reference numeral 9 represent a network control unit (NCU). Reference numeral 10 represents a telephone line. Reference numeral 11 represents a reading unit. Reference numeral 12 represent an image processing unit. Reference numeral 13 represents a transmitting function unit. Reference numeral 14 represents a receiving function unit. Reference numeral 15 represents a recording unit. Reference numeral 16 represents an RS-232C port.

The encoding/decoding circuit 6 is a circuit which performs compression and expansion. The enciphering/deciphering circuit 7 performs encipherment when the facsimile apparatus incorporating a fax modem according to this embodiment operates as a transmitting side, and performs decipherment when the facsimile apparatus operates as a receiving side. The image processing unit 12 performs processing such as shading correction to the image data read out by the reading unit 11.

As shown in FIG. 4, the operation unit 5 has a key array 5a operated by the user and a liquid crystal display panel (hereinafter, referred to as LCD) 5b. The key array 5a includes function keys, menu selecting keys, input keys and number keys (not shown). The reading unit 11 has a scanner 11a for reading out an original. The recording unit 15 includes a printer unit 15a. As shown in FIG. 4, the operation unit 5, the modem 8, the NCU 9, the scanner 11a and the printer unit 15a are connected to the CPU 2 through a data bus 17.

Subsequently, control of a printing operation performed by the control unit 1 to print out the data transmitted from the personal computer 100 will be described with reference to the flowchart of FIG. 5. First, the telephone number for the printing function is registered (step 301). This processing is necessarily performed only when a brand-new facsimile apparatus is used for the first time. By this processing, a printing function telephone number is allotted to the facsimile apparatus.

Figure 6:
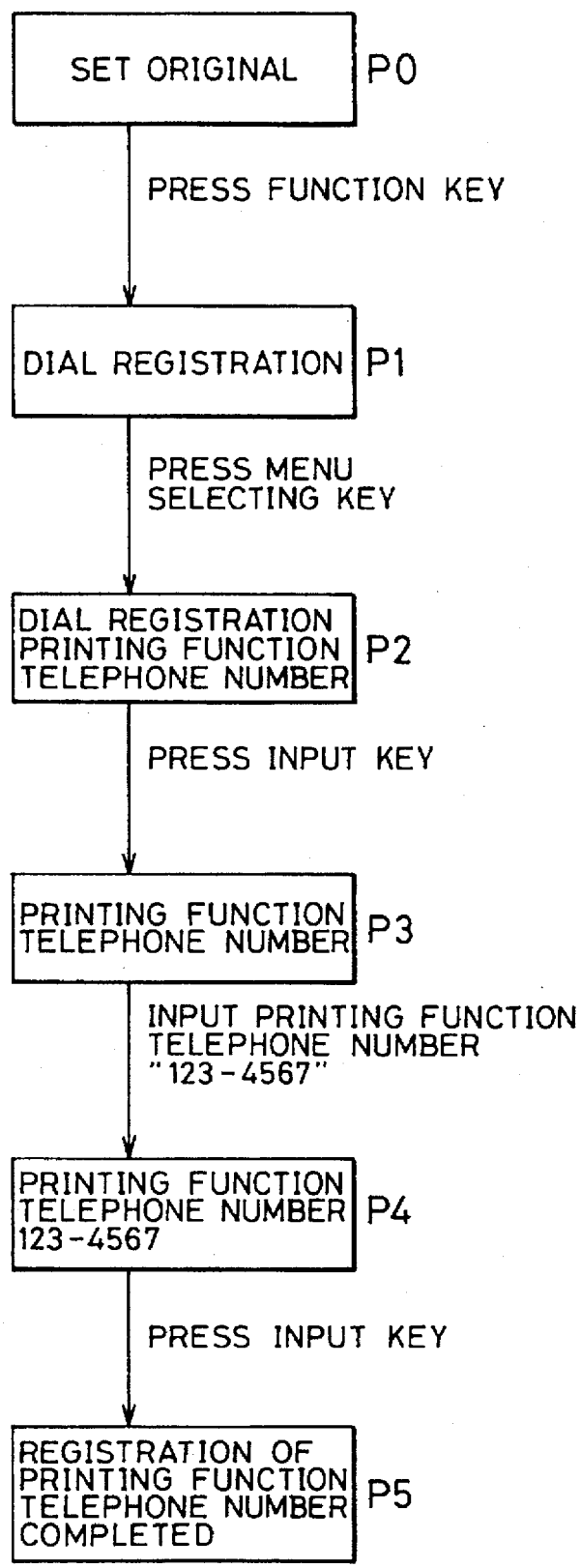
FIG. 6 is a flowchart showing changes of displays provided in a liquid crystal display panel in registering a telephone number for a printing function.

Now, an example of an operation to register the printing function telephone number will be described with reference to the flowchart of FIG. 6 showing changes of displays in the LCD 5b. In the initial state, a display "SET ORIGINAL" is provided in the LCD 5b (P0). This is a display for the normal facsimile function. When the user presses a function key of the key array 5a to call a telephone number registering function, a display "DIAL REGISTRATION" is provided in the LCD 5b (P1).

Then, when the user presses a menu selecting key of the key array 5b to select a printing function telephone number registration menu, the display in the LCD 5b is changed to the one as shown at P2, and when the user presses an input key of the key array 5a, the display in the LCD 5b is changed to the one as shown at P3. In this state, the user presses number keys of the key array 5a to input the telephone number (123-4567 in this case) used for the printing function. Thereby, the display in the LCD 5b is changed the one as shown at P4. Thereafter, when the user presses the input key, the registration of the printing function telephone number of the facsimile apparatus is completed and the display in the LCD 5b is changed to the one as shown at P5. The printing function telephone number is stored in the RAM 4 (see FIG. 4) when the above-described telephone number registration is completed.

Figure 5:
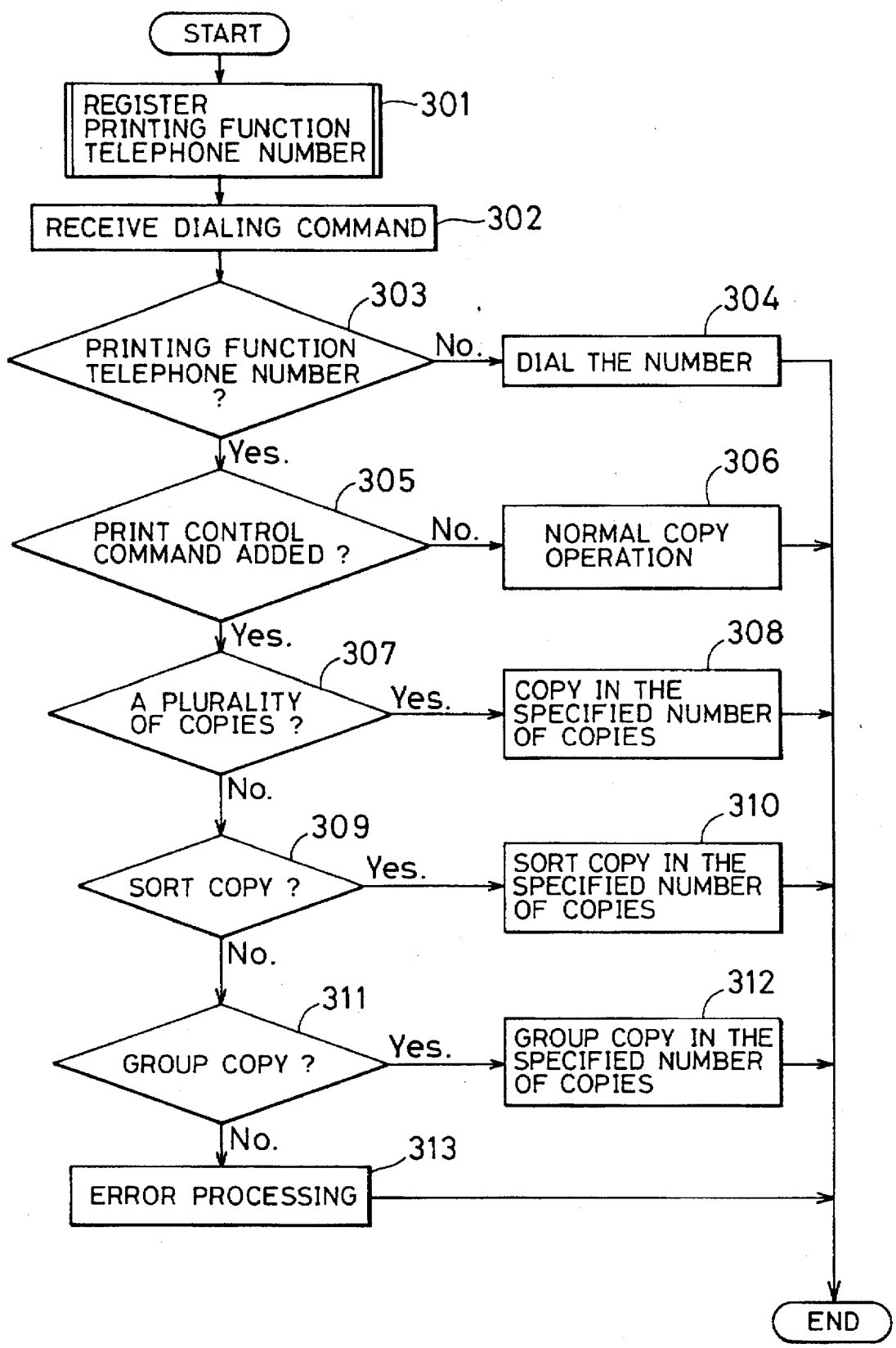
FIG. 5 is a flowchart of control of a printing operation performed by the control unit of FIG. 3.

Returning to the flowchart of FIG. 5, the description of control of the printing operation will be continued. At step 302, a dialing command from the personal computer is received. The dialing command consists of the previously-described ATD command and a print control command added at the end of the ATD command. The print control command used in this embodiment consists of two letters which are S or G or # and a succeeding number. The print control command is stored in the ROM 3 (see FIG. 4) together with the AT command system as commands of contents defined in the following:

S: Print out an original of a plurality of sheets in a plurality of copies while specifying a sort copy.

G: Print out an original of a plurality of sheets in a plurality of copies while specifying a group copy.

: Print out an original of one sheet in a plurality of copies.

The "plurality of copies" in the above definition means a one-figure number of copies. Therefore, with the facsimile apparatus according to this embodiment, in a single transmission from the personal computer 100, originals can be copied in up to nine copies which can be specified by one number succeeding the above-described S or G or #.

For example, in printing out an original of three sheets in three copies with the print control command, when the sort copy is specified (S3), the original is printed out in the order of the first sheet, the second sheet, the third sheet, the first sheet, the second sheet, the third sheet, the first sheet, the second sheet and the third sheet. When the group copy is specified (G3), the original is printed out in the order of the first sheet, the first sheet, the first sheet, the second sheet, the second sheet, the second sheet, the third sheet, the third sheet and the third sheet.

Now, a specific example of the dialing command will be described. Since the printing function telephone number is 123-4567 (see P3 of FIG. 6), when an original of a plurality of sheets is copied in three copies while the group copy is specified, the following dialing command (1) is transmitted from the personal computer 100 to the facsimile apparatus of this embodiment:

$$\text{ATD123-4567G3} \quad \ldots (1)$$

Hereinafter, description will be given on the assumption that the dialing command (1) is transmitted from the personal computer 100 to the facsimile apparatus of this embodiment. When the ATD command and the print control command are received by the RS-232C port 16 as described above (step 302), the process proceeds to the next step 303 to determine whether the telephone number specified by the ATD command is a print function telephone number or not. When it is not a print function telephone number, the telephone number is dialed to originate a call through the telephone line 10 (step 304). In this case, however, since the telephone number is a print function telephone number, the process proceeds to step #305.

At step 305, whether a print control command is added at the end of the AT command or not is determined. When no print control command is added, only one copy is printed out (step 306). In this case, however, since a print control command "G3" is added, the process proceeds to step 307.

At step 307, whether the second letter or character from the end of the print control command added to the ATD command is "#" or not is determined. When it is "#", since printing of an original of one sheet in a plurality of copies is specified, the original is printed out in the number of copies specified by the first letter or character from the end of the print control command (step 308). In this case, however, since the second letter from the end of the print control command is "G", the process proceeds to step 309.

At step 309, whether the second letter from the end of the print control command added to the ATD command is "S" or not is determined. When it is "S", since the sort copy is specified, the original of a plurality of sheets is printed out in the number of copies specified by the first letter or character from the end of the print control command in the sort copy manner (step 310). In this case, however, since the second letter from the end of the print control command is "G", the process proceeds to step 311.

At step 311, whether the second letter from the end of the print control command added to the ATD command is "G" or not is determined. When it is "G", since the group copy is specified, the original of a plurality of sheets is printed out in the number of copies specified by the first letter or character from the end of the print control command (step 312). In this case, since the print control command is "G3", the original is printed out in three copies in the group copy manner.

When the second letter or character from the end of the print control command is not S or G or #, it is determined that an unrecognizable control code is used and an error processing such as providing a display to notify abnormality in the LCD 5b is performed (step 313).

The printing operation is completed through the above-described processings. The facsimile apparatus according to this embodiment is provided with not only the above-described printing function but also the previously-mentioned PC-FAX function and the normal facsimile function to read out image data of an original with the reading unit 11 to facsimile transmit them through the telephone line 10 and to facsimile-receive image data transmitted through the telephone line 10 to print out them from the recording unit 15.

Since the printing operation by the recording unit 15 is controlled based on the print control command added to the ATD command as described above, the printing function is not limited even though the recording unit 15 used for the normal facsimile reception is used also as a printer of the personal computer 100. Therefore, according to the facsimile apparatus of this embodiment, the original can be printed out in a plurality of copies in a single data transmission from the personal computer 100, and higher functions such as the sort copy and the group copy can be used in the printing.

Since the printing function can be realized without changing the AT command system and is no different, to the personal computer 100, from the normal transmission according to the PC-FAX function, applications software in the personal computer 100 can be used to use the printing function. Further, as described previously, since it is unnecessary to connect a printer to the personal computer 100, the duplication of apparatuses having the printing function is avoided.

While "S" and "G" are used as the letters to specify the sort copy and the group copy, respectively, in this embodiment, other letters may be used. Moreover, combinations of numbers may be used. The present invention is not limited to the above-described embodiment but can be modified and practiced in various forms within the scope of the invention.

As described above, according to an information communicating apparatus of the present invention, since the controlling means controls the printing function of the printing means based on the print control command included in the telephone number information, the image information transmitted from an external information processing apparatus is printed out with a high function. Since the high printing function is realized without changing the telephone number information system and is no different, to the information processing apparatus, from the normal transmission according to the PC-FAX function, applications software in the information processing apparatus can be used to use the printing function. In addition, since the printing function is performed on software, the realization of the printing function does not increase the cost.

Obviously, many modifications and variations of the present invention are possible in light of the above teachings. It is therefore to be understood that within the scope of the appended claims, the invention may be practiced other than as specifically described.

What is claimed is:

1. An information communicating apparatus which receives telephone number information and image information transmitted from an external information processing apparatus, dials a telephone number included in the telephone number information to originate a call, and transmits said image information through a telephone line, said information communicating apparatus comprising:

printing means for printing out the image information; and controlling means for, when the telephone number included in the telephone number information is a pre-registered telephone number for a printing function and the telephone number information includes a print control command, which command includes a copy number representation, to control the printing function of the printing means, controlling a printing operation by the printing means so that the printing means prints out the image information a number of times corresponding with said copy number representation based on the print control command.

2. An information communicating apparatus according to claim 1, wherein the telephone number information is transmitted as an ATD command and the print control command, with copy number representation, is attached at the end of the ATD command.

3. An information communicating apparatus according to claim 2, wherein said print control command features a group copying representation succeeded by a number as said copy number representation.

4. An information communicating apparatus according to claim 2, wherein said print control command features a sort copying representation succeeded by a number as said copy number representation.

5. An information communicating apparatus according to claim 1, wherein said print control command is a command to print out an original of a plurality of sheets in a plurality of copies while specifying a sort copy.

6. An information communicating apparatus according to claim 1, wherein said print control command is a command to print out an original of a plurality of sheets in a plurality of copies while specifying a group copy.

* * * * *